United States Patent
Thimmanagari et al.

(10) Patent No.: US 7,035,999 B2
(45) Date of Patent: Apr. 25, 2006

(54) REGISTER WINDOW FILL TECHNIQUE FOR RETIREMENT WINDOW HAVING ENTRY SIZE LESS THAN AMOUNT OF FILL INSTRUCTIONS

(75) Inventors: Chandra Thimmanagari, Fremont, CA (US); Sorin Iacobovici, San Jose, CA (US); Rabin Sugumar, Sunnyvale, CA (US); Robert Nuckolls, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 537 days.

(21) Appl. No.: 10/165,256

(22) Filed: Jun. 7, 2002

(65) Prior Publication Data

US 2003/0229772 A1 Dec. 11, 2003

(51) Int. Cl.
*G06F 9/22* (2006.01)
(52) U.S. Cl. .................. 712/218; 712/228; 712/243
(58) Field of Classification Search ............... 712/228, 712/218, 243

See application file for complete search history.

(56) References Cited

U.S. PATENT DOCUMENTS 5,687,338 A * 11/1997 Boggs et al. ............... 712/205
5,764,971 A *  6/1998 Shang et al. ............... 712/244
5,941,977 A *  8/1999 Panwar et al. ............... 712/23

OTHER PUBLICATIONS

Goodman and Miller. "A Programmer's View of Computer Architecture." Oxford University Press, Inc., 1993. pp. 182, 232-233, 239.*

"The American Heritage College dictionary, 4th ed.. " Houghton Mifflinn Company, 2002. p. 1211.*

* cited by examiner

*Primary Examiner*—Eddie Chan
*Assistant Examiner*—Kevin P. Rizzuto
(74) *Attorney, Agent, or Firm*—Osha Liang LLP

(57) ABSTRACT

A register window fill technique for a retirement window having an entry size less than a number of fill instructions used in a fill condition is provided. The technique uses modified fill instructions that allow the retirement window to retire a portion of the fill instructions without having to determine whether a remaining portion of the fill instructions will execute without exceptions.

8 Claims, 4 Drawing Sheets

REGISTER WINDOW FILL TECHNIQUE FOR RETIREMENT WINDOW HAVING ENTRY SIZE LESS THAN AMOUNT OF FILL INSTRUCTIONS

BACKGROUND OF THE INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system 10 having a microprocessor 12, memory 14, integrated circuits 16 that have various functionalities, and communication paths 18, i.e., buses and signals, that are necessary for the transfer of data among the aforementioned components of the computer system 10.

A microprocessor, such as the one shown in FIG. 1, typically includes an integer unit and a floating point-unit, each with its own registers. This organization allows for implementations with concurrency between integer and floating-point instruction execution. Typically, the integer unit contains general-purpose registers and controls the overall operation of the microprocessor. The integer unit executes the integer arithmetic instructions and computes memory addresses for loads and stores. The integer unit also maintains the program counter and controls instruction execution for the floating-point unit.

In an exemplary implementation of an integer unit, the integer unit may contain 64 to 528 general-purpose 64-bit r registers (an r register is an integer register and is also known in the art as a "general-purpose register" or "working register"). They are partitioned into 8 global registers, 8 alternate global registers, 8 MMU global registers, 8 interrupt global registers, plus an implementation-dependent number of 16-register sets. As shown in Table 1, a "register window" consists of the current 8 in registers, 8 local registers, and 8 out registers.

TABLE 1

Window Addressing

| Windowed Register Address | r Register Address |
|---|---|
| in[0]–in[7] | r[24]–r[31] |
| local[0]–local[7] | r[16]–r[23] |
| out[0]–out[7] | r[8]–r[15] |
| global[0]–global[7] | r[0]–r[7] |

Registers r[0]–r[7] refer to a set of eight registers called the global registers, g0–g7. At any given time, one of four sets of eight registers is enabled and can be accessed as the global registers. Which set of global registers is currently enabled is selected by an alternate global (AG, MG, GG, or IG) field in a processor stage register (PSTATE). Global register zero, g0, typically reads a zero, i.e., writes to it have no program-visible effect.

At any time, an instruction may access the 8 global registers and a 24-register window into the r registers. A register window comprises the 8 in and 8 local registers of a particular register set together with the 8 in registers of an adjacent register set, which are addressable from the current window as out registers.

As an example of register windowing, FIG. 2 shows a 5 register window architecture 20. As those skilled in the art will understand, although FIG. 2 shows a 5 register window scheme, the number of windows or register sets is implementation-dependent. The total number of r registers in a given implementation is 8 (for the global registers), plus 8 (for the alternate global registers), plus 8 (for the MMU global registers), plus 8 (for the interrupt global registers), plus the number of sets multiplied by 16 registers/set.

A current window into the r registers is given by the current window pointer (CWP) register. The CWP is decremented by a RESTORE instruction and is incremented by a SAVE instruction. Window overflow is detected via a CANSAVE register and window underflow is detected via a CANRESTORE register. More specifically, the CANSAVE register contains the number of register windows following CWP that are not in use and are available to be allocated by a SAVE instruction. The CANRESTORE register contains the number of register windows preceding CWP that are in use by the current program and can be restored via the RESTORE instruction.

Additionally, state registers OTHERWIN and CLEANWIN may be used in some register window schemes. The OTHERWIN register contains the count of register windows that will be spilled/filled using a particular set of trap vectors. When all of the register windows fill and another register window is saved, a register window overflow, or "spill" occurs, in which case some number of registers are saved to the program stack. Alternatively, when restoring a register window that is not already in a register window, a register window underflow, or "fill" occurs, in which case some number of register windows are restored from the program stack. In some implementations, the OTHERWIN register may be used to split the register windows among different address spaces and handle spill/fill traps using separate spill/fill vectors. The CLEANWIN register counts the number of registers that are "clean" with respect to the current program. That is, register windows that contain only zeroes, valid addresses, or valid data from that program are counted. Registers in these windows need not be cleaned before they are used. The count includes the register windows that can be restored (the value in the CANRESTORE register) and the register windows following CWP that can be used without cleaning.

As discussed above, each window shares its ins with one adjacent window and its outs with another. The outs of the CWP−1 window are addressable as the ins of the current window, and the outs in the current window are the ins of the CWP+1 window. The locals are unique to each window. When one function, or subroutine, calls another, the callee may choose to execute a SAVE instruction. This instruction increments CWP, shifting the register window upward. The caller's out registers then become the callee's in registers, and the callee gets a new set of local and out registers for its own use. Only the CWP changes because the registers and return address do not need to be stored on a stack. The CALL instruction automatically saves its own address in, for example, out register 7, which becomes in register 7 if CWP is incremented. Therefore, the callee may access the return address whether or not it has decremented CWP.

SUMMARY OF THE INVENTION

According to one aspect of the present invention, a method for performing a fill operation for a register window comprises: determining whether a restore instruction causes a fill condition; if the restore instruction causes the fill condition, sending a portion of a fill instruction set to a retirement window; retiring at least one instruction of the portion of the fill instruction set, where execution of the at least one instruction updates a temporary register; and sending another portion of the fill instruction set to the retirement window upon execution of the at least one instruction.

According to another aspect, a method for performing a register window fill operation comprises: step for determining whether a restore instruction causes a fill condition; if the restore instruction causes the fill condition, step for sending a portion of a fill instruction set to a retirement window; step for retiring at least one instruction of the portion of the fill instruction set, where execution of the at least one instruction updates a temporary register; and step for sending another portion of the fill instruction set to the retirement window upon execution of the at least one instruction.

According to another aspect, a computer system comprises: a processor; a memory; and a fill instruction set, residing in the memory and executable by the processor, for saving particular contents of a program stack in memory to a register in a register window, where the fill instruction set is arranged so as to allow a retirement window to retire a portion of the fill instruction set without a determination as to whether a remaining portion of the fill instruction set will result in at least one exception, and where the remaining portion is not in the retirement window.

Other aspects and advantages of the invention will be apparent from the following description and the appended claims.

DETAILED DESCRIPTION

Figure 1:
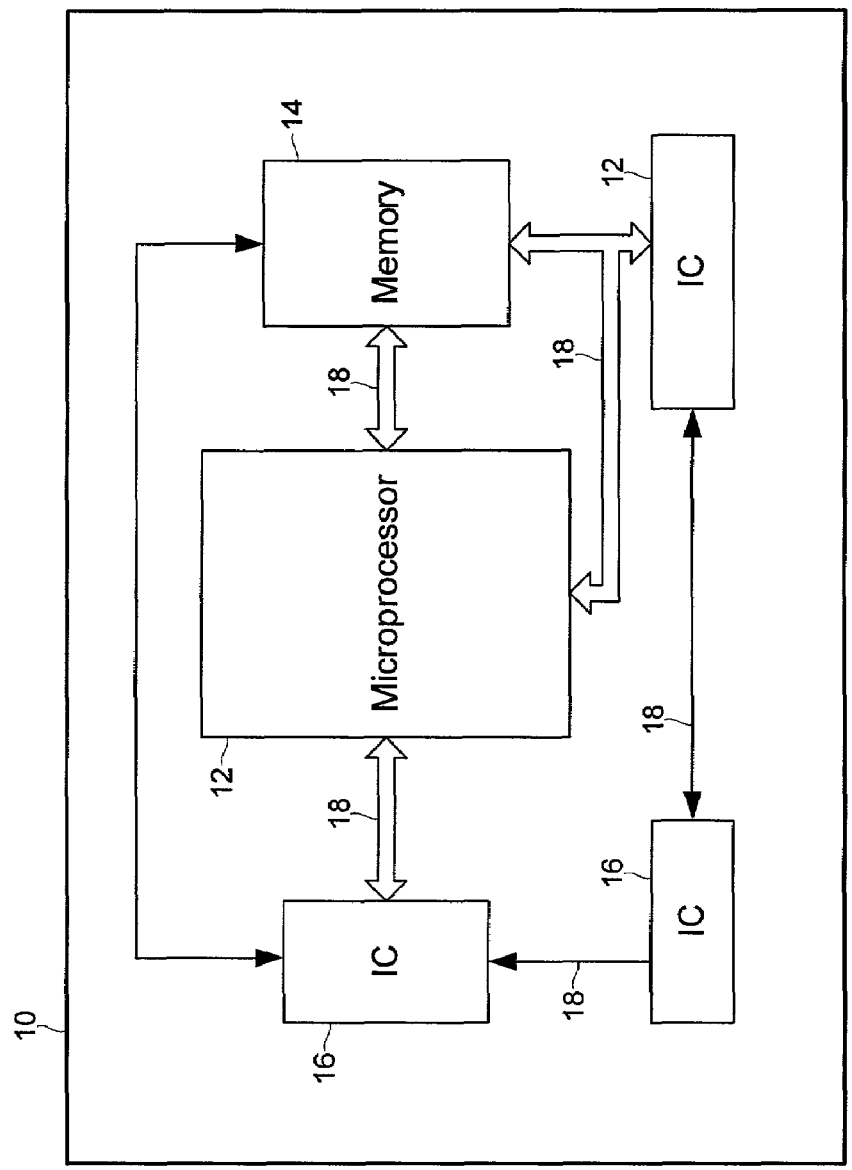
FIG. 1 shows a typical computer system.
Figure 2:
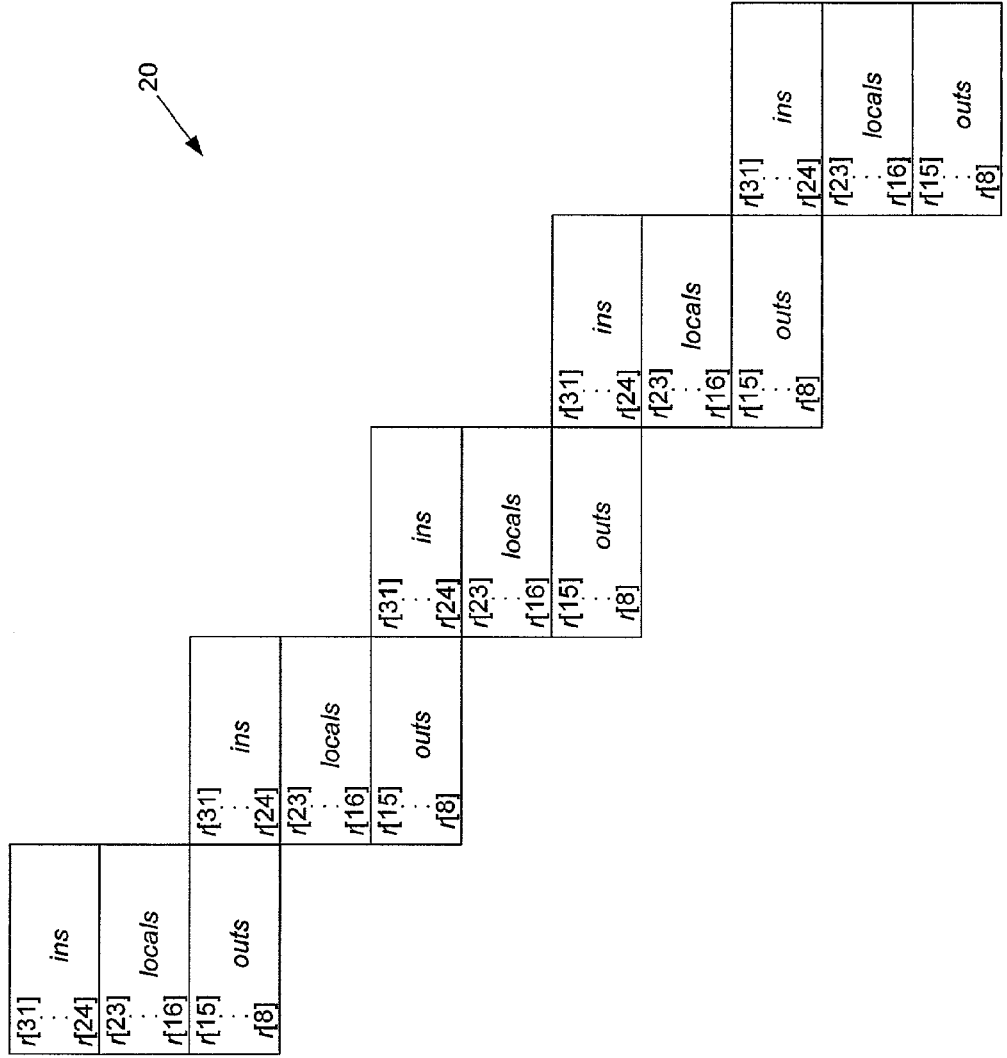
FIG. 2 shows a typical register window implementation.
Figure 3:
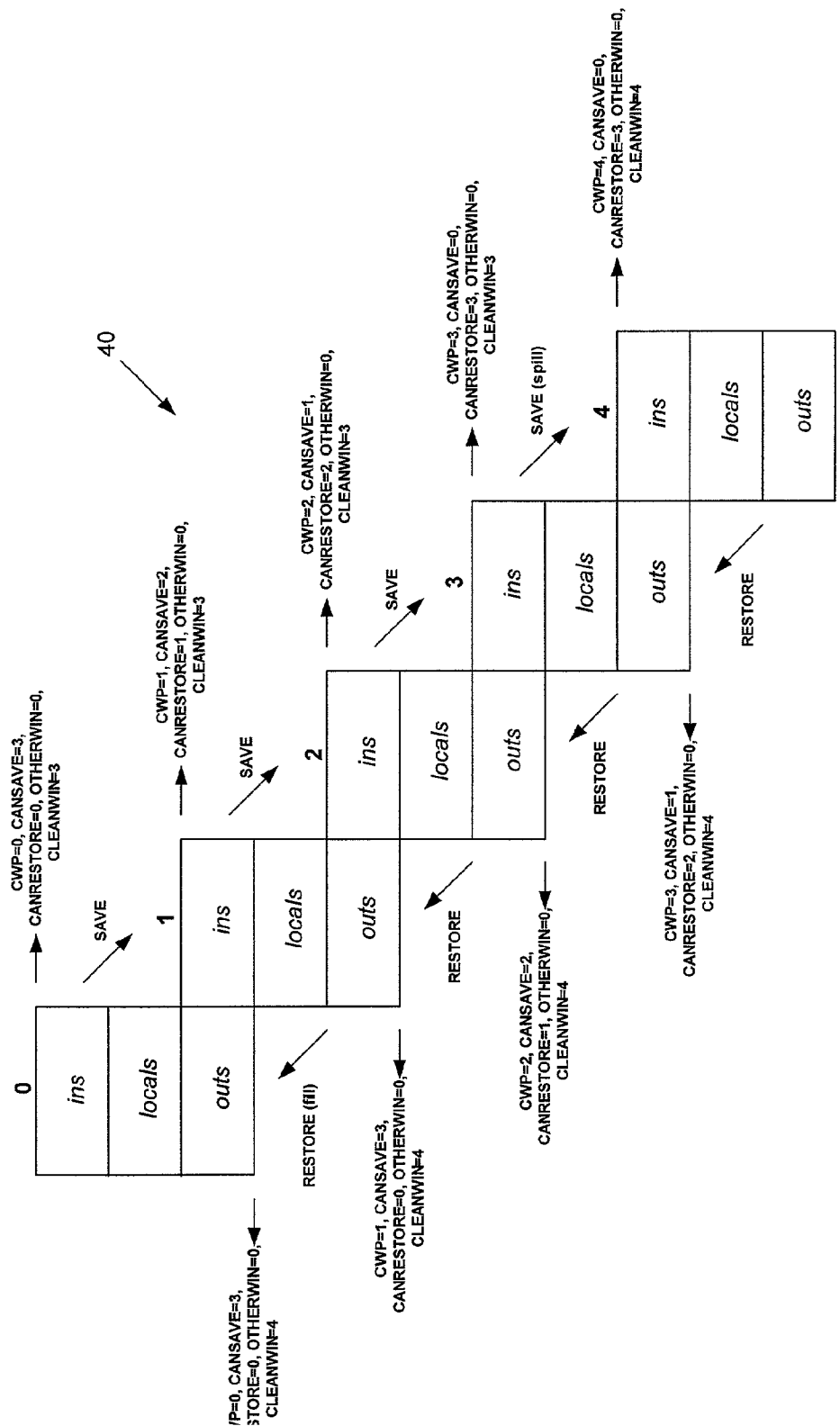
FIG. 3 shows a register window implementation in accordance with a description of an embodiment of the present invention.

FIG. 3 shows register values for an exemplary 5-register window scheme 40 in accordance with a description of an embodiment of the present invention. In FIG. 3, the register values for CWP, CANSAVE, CANRESTORE, OTHERWIN, and CLEANWIN are shown with respect to SAVEs and RESTOREs of windows 0–4.

When CWP points to window 1 and a RESTORE occurs, a fill condition occurs, in which particular contents of a program stack are popped, i.e., restored, to window 0. When such a fill condition occurs, some prior art implementations issue a software trap, whereby a software trap handler is used to execute fill instructions necessary to restore certain contents of the program stack into window 0. However, issuing and handling a trap leads to a performance blow, and thus, such treatment of the fill condition is undesirable. In other implementations, the fill instructions necessary to restore certain contents of the program stack into window 0 are implemented in hardware through the use of a read-only memory (ROM). The read-only memory is used to store the fill instructions, and when a fill condition occurs, the fill instructions are forwarded to a retirement window and a processor pipeline. One example of a set of fill instructions is as follows:

| | |
|---|---|
| (inst1) | H_SRL %o6, 0, %o6 |
| (inst2) | H_LDUW [%o6+BIAS32+0], %l0 |
| (inst3) | H_LDUW [%o6+BIAS32+4], %l1 |
| (inst4) | H_LDUW [%o6+BIAS32+8], %l2 |
| (inst5) | H_LDUW [%o6+BIAS32+12], %l3 |
| (inst6) | H_LDUW [%o6+BIAS32+16], %l4 |
| (inst7) | H_LDUW [%o6+BIAS32+20], %l5 |
| (inst8) | H_LDUW [%o6+BIAS32+24], %l6 |
| (inst9) | H_LDUW [%o6+BIAS32+28], %l7 |
| (inst10) | H_LDUW [%o6+BIAS32+32], %i0 |
| (inst11) | H_LDUW [%o6+BIAS32+36], %i1 |
| (inst12) | H_LDUW [%o6+BIAS32+40], %i2 |
| (inst13) | H_LDUW [%o6+BIAS32+44], %i3 |
| (inst14) | H_LDUW [%o6+BIAS32+48], %i4 |
| (inst15) | H_LDUW [%o6+BIAS32+52], %i5 |
| (inst16) | H_LDUW [%o6+BIAS32+56], %i6 |
| (inst17) | H_LDUW [%o6+BIAS32+60], %i7 |
| (inst18) | H_RESTORED |

With respect to the above fill instructions, the H_LDUW instruction is a load instruction and architectural register %o6 is the base address from which the contents of the program stack are restored to window 0 (FIG. 3). Those skilled in the art will note that in the instructions above, instructions 2–17 may result in one or more exceptions. The contents of window 0 (FIG. 3) are restored with respect to increments of 4 because of an assumption that the fill condition occurs for 32-bit code. Those skilled in the art will appreciate that in other embodiments, the instructions may vary according to code specifications.

In the situation where the number of fill instructions is less than or equal to the size of the retirement window, i.e., retirement window size>=number of fill instructions, the fill instructions can all fit into the retirement window. Thereafter, the instructions are checked to determine whether one or more of the instructions results in an exception. If one of the above instructions results in an exception, then remedial action must be taken because one or more of the architectural registers may be incorrectly updated. If there are no exceptions, then the instructions are executed and retired and normal operation continues.

If the retirement window size is less than the number of fill instructions, then the treatment of the fill condition becomes more difficult. For example, if a system uses a 16-instruction retirement window, then upon a fill condition, only 16 of the above 18 instructions can be sent to the retirement window. If instructions 1–16 are sent to the 16-instruction retirement window, then a deadlock state occurs because instruction 17 is not part of the 16-instruction retirement window and the instructions in the 16-instruction retirement window cannot be retired until it is known that all the fill instructions are exception free. In other words, the retirement window cannot retire the fill instructions until it is determined that the fill instructions that are not in the retirement window will be executed exception-free.

Embodiments of the present invention relate to a register window fill technique for a retirement window that has an entry size less than a number of fill instructions used in a fill condition. The present invention uses modified fill instructions that allow a retirement window to retire a portion of the fill instructions without having to determine whether a remaining portion of the fill instructions will execute without exceptions. An example of a fill instruction set in accordance with an embodiment of the present invention is as follows:

```
(inst1)    H_SRL %o6, 0, %temp
(inst2)    H_LDUW [%temp+BIAS32+0], %l0
(inst3)    H_LDUW [%temp+BIAS32+4], %l1
(inst4)    H_LDUW [%temp+BIAS32+8], %l2
(inst5)    H_LDUW [%temp+BIAS32+12], %l3
(inst6)    H_LDUW [%temp+BIAS32+16], %l4
(inst7)    H_LDUW [%temp+BIAS32+20], %l5
(inst8)    H_LDUW [%temp+BIAS32+24], %l6
(inst9)    H_LDUW [%temp+BIAS32+28], %l7
(just10)   H_LDUW [%temp+BIAS32+32], %i0
(inst11)   H_LDUW [%temp+BIAS32+36], %i1
(inst12)   H_LDUW [%temp+BIAS32+40], %i2
(inst13)   H_LDUW [%temp+BIAS32+44], %i3
(inst14)   H_LDUW [%temp+BIAS32+48], %i4
(inst15)   H_LDUW [%temp+BIAS32+52], %i5
(inst16)   H_LDUW [%temp+BIAS32+56], %i6
(inst17)   H_LDUW [%temp+BIAS32+60], %i7
(inst18)   H_SRL %temp, 0, %o6
(inst19)   H_RESTORED
```

With respect to the above set of fill instructions, %temp is a temporary register that is used to restore certain contents of the program stack to window 0 (FIG. 3). Those skilled in the art will note that in the instructions above, instructions 2–17 may result in one or more exceptions.

In the case of a fill condition involving a 16-instruction retirement window, instructions 1–16 are sent to the retirement window, whereby instruction 1 is executable/retirable, after which instruction 17 is sent to the retirement window. Thereafter, a determination may be made as to whether any of instructions 2–17 result in an exception, in which case appropriate remedial action be taken. Because a temporary register %temp is used at the outset of the fill condition, if an exception results, an architectural register, such as architectural register %o6 above, is not adversely impacted. If instructions 2–17 are exception-free, then they are retired, at which point the contents of the temporary register %temp are copied over to architectural register %o6 (inst18).

Those skilled in the art will understand that although the discussion with respect to FIG. 3 relates to a 5-register window scheme, the principles of the present invention are equally applicable to register window schemes using a different number of register windows and to systems having different specifications (i.e., 64-bit registers instead of 32-bit registers).

Figure 4:
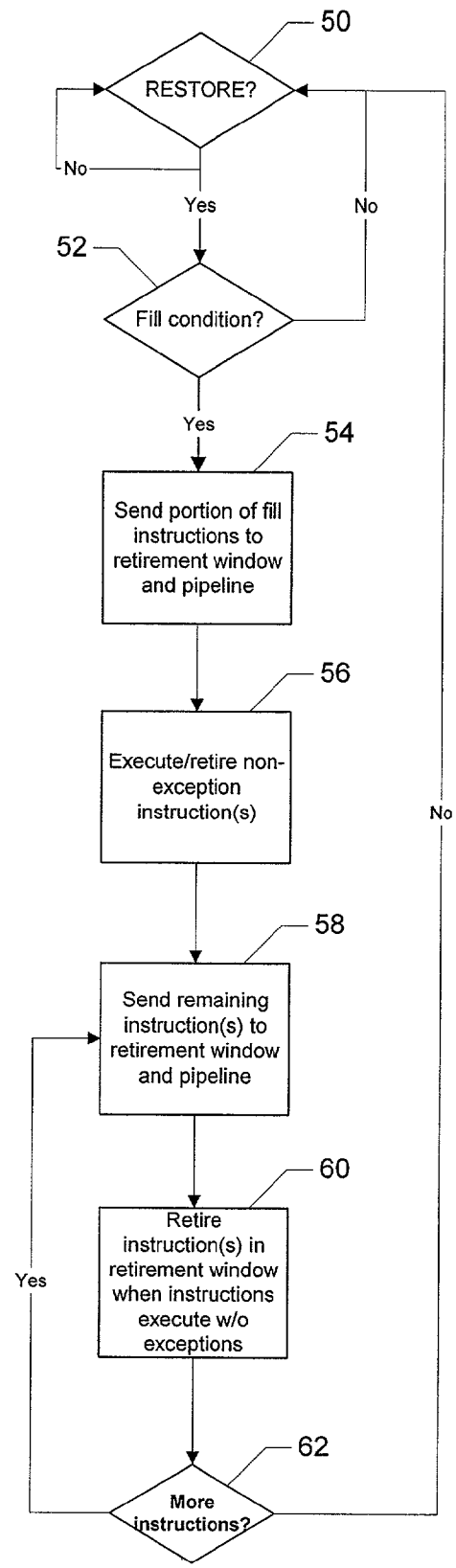
FIG. 4 shows a flow process in accordance with an embodiment of the present invention.

FIG. 4 shows a flow process in accordance with an embodiment of the present invention. The flow process of FIG. 4 pertains to a situation in which an retirement window size is less than the amount of fill instructions used in a particular fill condition. In 50, a determination is made as to when a RESTORE instruction occurs. In 52, if a RESTORE occurs, a determination is made as to whether the RESTORE instruction results in a fill condition. Such a determination may be made using the contents of the CANSRESTORE register (FIG. 3). If CANRESTORE equals zero, as is with the case with window 1 in FIG. 3, this indicates that a RESTORE instruction cannot be performed without handling a fill condition. If the RESTORE does not result in a fill condition, then normal RESTORE instruction action is taken.

However, if the RESTORE does result in a fill condition, in 54, a portion of a set of fill instructions is sent to the retirement window. In 56, non-exception instructions, such as instruction 1 above, are executed/retired, thereby, in 58, allowing for remaining instruction(s) of the fill instruction set to be sent to the retirement window. Thereafter, in 60, the remaining unretired instructions in the retirement window are checked for exceptions and if all of them execute without exceptions, they are then retired. If after this iteration, in 62, more instructions of the fill instruction set are remaining that have not yet been sent to the retirement window, those instructions are forwarded to the retirement window in 58.

As mentioned above, the fill instruction set is designed so as to allow the retirement of certain fill instructions irregardless of whether other fill instructions would result in an exception. In the case of an exception, adverse architectural register impact is avoided because the present invention uses a temporary register so as to allow certain instructions of a fill instruction set to be executed/retired without consideration of other fill instructions.

Advantages of the present invention may include one or more of the following. In some embodiments, because a register window fill technique for a retirement window having a size less than an amount of fill instructions needed to perform a register window fill operation is provided, the issuance and handling of performance hindering software traps is avoided.

In some embodiments, because a modified fill instruction set allows a retirement window to retire certain fill instructions without a determination as to whether other fill instructions result in one or more exceptions, a system using a retirement window having a size less than the amount of fill instructions needed to perform a fill operation is able to efficiently and accurately handle a fill condition.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a fill operation for a register window, comprising:
    determining whether a restore instruction causes a fill condition;
    if the restore instruction causes the fill condition, sending a portion of a fill instruction set to a retirement window of a fixed entry size less than an amount of instructions in the fill instruction set;
    retiring at least one instruction of the portion of the fill instruction set, wherein execution of the at least one instruction updates a temporary register; and
    sending another portion of the fill instruction set to the retirement window upon execution of the at least one instruction; and storing contents of the temporary register to an architectural register upon exception-free execution of the portion of the fill instruction set and the another portion of the fill instruction set.

2. The method of claim 1, wherein execution of the at least one instruction does not update an architectural register.

3. The method of claim 1, wherein the fill instruction set comprises instructions for saving particular contents of a program stack to a register in the register window.

4. A method for performing a register window fill operation, comprising:
    step for determining whether a restore instruction causes a fill condition;
    if the restore instruction causes the fill condition, step for sending a portion of a fill instruction set to a retirement window of a fixed entry size less than an amount of instructions in the fill instruction set;

step for retiring at least one instruction of the portion of the fill instruction set, wherein execution of the at least one instruction updates a temporary register; and step for sending another portion of the fill instruction set to the retirement window upon execution of the at least one instruction and step for storing contents of the temporary register to an architectural register upon exception-free execution of the portion of the fill instruction set and the another portion of the fill instruction set.

5. The method of claim 4, wherein execution of the at least one instruction does not update an architectural register.

6. A computer system, comprising:
a processor;
a memory; and
a fill instruction set, residing in the memory and executable by the processor, for saving particular contents of a program stack in memory to a register in a register window, wherein the fill instruction set is arranged so as to allow a retirement window to retire a portion of the fill instruction set without a determination as to whether a remaining portion of the fill instruction set will result in at least one exception, and wherein retirement window is of a fixed entry size less than an amount of instructions in the fill instruction set wherein execution of at least one instruction of the spill instruction set results in an update of a temporary register, and wherein contents of the temporary register are stored in an architectural register upon exception-free execution of the spill instruction set.

7. The computer system of claim 6, wherein execution of at least instruction in the portion of the fill instruction set updates a temporary register.

8. The computer system of claim 6, wherein the temporary register is used to restore particular contents of the program stack to the register window.

* * * * *